(12) United States Patent
De Moyer

(10) Patent No.: US 11,376,099 B2
(45) Date of Patent: Jul. 5, 2022

(54) DENTAL SURGERY GUIDE SYSTEM

(71) Applicant: 2INGIS S.A., Brussels (BE)

(72) Inventor: Philippe De Moyer, Brussels (BE)

(73) Assignee: 2INGIS SA, Brussels (BE)

( * ) Notice: Subject to any disclaimer, the term of this patent is extended or adjusted under 35 U.S.C. 154(b) by 0 days.

(21) Appl. No.: 16/061,878

(22) PCT Filed: Dec. 12, 2016

(86) PCT No.: PCT/EP2016/080635
§ 371 (c)(1),
(2) Date: Jun. 13, 2018

(87) PCT Pub. No.: WO2017/102646
PCT Pub. Date: Jun. 22, 2017

(65) Prior Publication Data
US 2018/0368937 A1    Dec. 27, 2018

(30) Foreign Application Priority Data

Dec. 14, 2015 (LU) .......................................... 92907

(51) Int. Cl.
*A61C 1/08* (2006.01)
*A61C 3/03* (2006.01)
*A61C 8/00* (2006.01)

(52) U.S. Cl.
CPC ................ *A61C 1/084* (2013.01); *A61C 3/03* (2013.01); *A61C 8/0089* (2013.01)

(58) Field of Classification Search
CPC ......... A61C 1/084; A61C 3/03; A61C 8/0089; A61C 1/082; A61B 17/176
See application file for complete search history.

(56) References Cited

U.S. PATENT DOCUMENTS

| | | | |
|---|---|---|---|
| 2005/0272005 A1* | 12/2005 | Schaffner | A61C 5/88 433/149 |
| 2008/0220390 A1* | 9/2008 | Klein | A61C 1/084 433/76 |
| 2009/0326440 A1* | 12/2009 | Lee | A61C 8/0092 604/22 |
| 2010/0185201 A1* | 7/2010 | Kim | A61C 1/084 606/80 |
| 2010/0297574 A1* | 11/2010 | Llop | A61C 8/0089 433/75 |
| 2013/0157219 A1* | 6/2013 | Lo | A61C 1/084 433/76 |

FOREIGN PATENT DOCUMENTS

| | | |
|---|---|---|
| DE | 19624381 A1 | 1/1998 |
| EP | 2229909 A1 | 9/2010 |
| FR | 2896403 A1 | 7/2007 |
| JP | 2009207688 A | 9/2009 |
| WO | 2008006802 A1 | 1/2008 |

\* cited by examiner

*Primary Examiner* — Heidi M Eide
*Assistant Examiner* — Drew S Folgmann
(74) *Attorney, Agent, or Firm* — Jerold I. Schneider; Schneider IP Law

(57) ABSTRACT

A dental surgery guide system for use with a dental handpiece for forming a bore in a patient's jaw bone to receive a dental implant comprises a surgical template and a handpiece jig; the top of the handpiece guide can slide below the top of the template guide rail.

19 Claims, 3 Drawing Sheets

DENTAL SURGERY GUIDE SYSTEM

The present invention relates to a dental surgery guide system.

Dental surgery commonly comprises drilling one or more bores in a patient's jaw bone and requires a high degree of precision, notably in the position, depth and axial orientation of the bore created. The drilling operation must also avoid undesirable interference with the patient's nervous and muscular systems. To facilitate such precision, a custom designed surgical template adapted to the patient's mouth and the intended surgical intervention may be used to provide a guide for a manually operated dental drill. WO 2008/006802, hereby incorporated by reference, describes such a dental surgery guide system.

According to one aspect, the present invention provides a dental surgery guide system as defined in claim 1. Other aspects are defined in other independent claim. The dependent claims define preferred or alternative embodiments.

In at least some of its aspects, the present invention provides a dental surgery guide system which combines precision, ease of use, accessibility to the surgical site and small dimensions; the small dimensions are particularly important for oral surgery towards the back of a patient's mouth as improving access and/or reducing the distance that a patient must open his or her mouth to allow access to surgery even by a few millimetres can provide a significant improvement.

The guide system may be used for oral or maxillofacial surgery, notably for a surgical operation on a patient's jaw bone or teeth including drilling, osteotomy, piezosurgery, creation of a bore, notably a cylindrical bore or a polygonal bore, insertion of an implant or screwing of an implant into a bore. The surgical intervention may be performed on a surgical site accessed through the patient's mouth, for example a sinus cavities. The surgical instrument may be a dental instrument, it may be: a drill bit, in which case the surgical handpiece may be a hand-held drill notably a dental drill; a piezotome tip, in which case the surgical handpiece may be a hand-held piezosurgery device; or a surgical tool adapted to drill or cut the patient's bone, notably jaw bone, in a precise way.

The dental implant may be: a support for a dental prosthesis, for example for a crown, bridge, denture or facial prosthesis; an anchor, notably an orthodontic anchor; or a bone implant.

The guide system may be used for surgery carried out at or on the lower or upper jaw bone of a patient or at a surgical site, including the gingiva, not limited to bone structure.

For ease of description spatial positions used herein for the surgical template and handpiece jig, notably references to top, bottom, upper and lower, are used as if the surgery is carried out on the lower jaw bone of the patient. Unless otherwise indicated, such terminology expresses relative positions and does not imply that described feature may only be used in the orientation referred to.

The surgical template is preferably a custom made surgical template designed for the patient's mouth and the intended surgical intervention. It may be designed and manufactured based on patient specific data, notably patient imaging, for example by magnetic resonance imaging (MRI), X-ray computed tomography (CT) or cone-beam X-ray computed tomography (CBCT). The imaging preferably provides an accurate 3D image of the bone and/or jaw bone and/or dentition and/or tissues of the patient's mouth which may be used to plan the surgical intervention, for example to virtually insert an intended dental implant into the image, determine the desired, position, orientation and depth of the implant and design a customised surgical template. The surgical guide may be supported by the patient's teeth and/or gingiva and/or bone structure and/or temporary or permanent implant(s); it may be secured within the patient's mouth by mechanical fixing, for example by clipping and/or screwing to teeth and/or bone and/or one or more implants. The surgical guide may comprise metal, notably a sintered metal and or plastics, notably reinforced plastics; its fabrication may comprise laser controlled sintering of a metal powder, 3D printing or 3D milling, with optional additional machining, notably of the template guide rail(s) for mechanical tolerance.

The opening of the surgical template that allows access for the surgical instrument, notably to create a bore in the patient's jaw bone, is preferably open at its lower end and more preferably the entire trajectory between the template guide rails is open; this facilitates visibility for the surgeon and/or irrigation of a surgical site, for example the drilling or implant site. The use of one or more template guide rail(s) having its longitudinal axis aligned parallel to and offset from the surgical or implant axis separates the guiding function provided by the template guide rail(s) from the surgical or drilling function provided for example by a drill bit or piezotome drilling tip. This allows an open design which facilitates visibility and/or irrigation; it also avoids issues of dimensional tolerances and friction of passing a rotating drill bit or a vibrating tip through a guide block. The surgical template may comprise two or more template guide rails; it preferably has two (and only two) guide rails, notably arranged so that the surgical or implant axis (which corresponds in some embodiments to a drilling access) and the axis of each guide rail are coplanar; this provides a particularly stable guide system. Where two template guide rails are used, each is preferably located on either side of the jaw bone or gingiva. The surgical template preferably allows a 360° rotation of the surgical handpiece; this facilitates the surgeon's access to the surgical site.

The template stop preferably forms part of the surgical template and is adapted to limit the distance the surgical instrument can advance, for example towards the patient's jaw bone; the surgeon may thus advance the surgical instrument until the template stop is engaged so that the predetermined position of the stop corresponds to a predetermined position of the surgical instrument, for example to a desired depth of bore to be provided in the patient's jaw bone. The template stop may be located on or in the template guide rail(s); this provides an accurate and compact arrangement. The surgical template preferably provides two template stops, for example a template stop provided in or on each of a pair of template guide rails; this stabilises the stopping function and reduces the risk of undesired twisting of the dental instrument. The position of the template stop(s) are preferably pre-determined as part of a custom design of the surgical template.

The surgical template is preferably a single use template intended for a single surgical intervention. It is preferably positioned and/or secured over the patient's upper or lower jaw bone.

The handpiece jig is adapted to be secured to the surgical handpiece, for example by clipping it onto a head of the surgical or dental handpiece or by a clamping ring or by a suitably adapted portion of the handpiece. Each handpiece guide of the handpiece jig is adapted to be engageable with a respective template guide rail provided on the surgical template. Cooperation between the handpiece guides and the template guide rails restrains the lateral position and the axial orientation of the surgical instrument with respect to the surgical template and thus with respect to the surgical site, for example at the patient's jaw bone. Preferably, a single degree of movement is provided for the surgical instrument, notably a sliding movement towards or away from the surgical site at a predetermined position and along a predetermined axis; this ensures positional and axial accuracy for the surgeon using a hand held surgical handpiece.

Cooperation, notably contact, between the handpiece stop(s) of the handpiece jig and the template stop(s) is intended to limit the depth or the dental instrument with respect to the surgical template and thus, for example the depth of a bore created in the patient's jaw bone. Preferably, the handpiece jig comprises two handpiece stops, each adapted to cooperate with a respective template stop.

Preferably, the handpiece jig is a multi-use jig intended for use with different surgical templates and suitable for sterilisation between uses. It may comprise one or more metal portions, notably metal surfaces, particularly machined metal surfaces, notably machined metal handpiece guide surfaces; this allows for a high degree of dimensional tolerance. Suitable materials include stainless steel, titanium and zirconium. Alternative materials for part or all of the handpiece jig include plastics, notably high density plastics, for example PEEK (PolyEtherEtherKetone), and ceramic materials.

The template guide rail may comprise a hollow guide portion or female configuration adapted to cooperate with a male configuration of its corresponding handpiece guide. The opposite is also possible, i.e. a male configuration of a portion of the template guide rail adapted to cooperate with a female configuration of its corresponding handpiece guide.

The interaction between the handpiece guide and the template guide rail may be a contact surface or contact line(s); the contact surface(s) or contact line(s) may be continuous or non-continuous.

The configuration in which the top of the handpiece guide can slide below the top of the template guide allows good guidance of the surgical instrument whilst rendering the arrangement compact in a way which facilitates access to the surgical site and/or limits the required opening of a patient's mouth, for example by allowing a short drill bit or dental instrument to be used to create a bore of a given depth.

The surgery guide system may comprise a handpiece jig which does not have a handpiece stop, or which is configured such that its handpiece stop(s) do not interact with the template stop(s). This may be used for a portion of the surgical intervention using the surgical template for which the stop(s) are unnecessary or undesirable.

According to a further aspect, the present invention provides a dental piezotome surgery guide system, notably for forming a bore in a patient's jaw bone to receive a dental implant, the dental surgery guide system comprising a surgical template adapted to be secured within the patient's mouth, the surgical template comprising an opening coinciding with a surgical axis, notably an implant axis for the dental implant, to allow passage of a piezotome tip notably to create the bore in the patient's jaw bone along the surgical axis; one or more template guide rails, each template guide rail having its longitudinal axis aligned parallel to and offset from the surgical axis; and a template stop. An associated aspect relates to a handpiece jig adapted to be secured to the piezotome tip or piezotome, said handpiece jig comprising one or more handpiece guides, each handpiece guide being engageable with a respective template guide rail of the surgical template, and a handpiece stop; wherein cooperation between the handpiece guide(s) and the template guide rail(s) restrains the lateral position and the axial orientation of the piezotome tip relative to the surgical template during surgical intervention; and wherein the template stop and the handpiece stop are adapted to cooperate to limit the position to which the piezotome tip can advance during the surgical intervention, notably during creation of a bore in the patient's jaw bone. The handpiece guide may be attached directly or indirectly to the piezotome tip or piezotome; it may be attached to a handle to which the piezotome tip is also attached.

According to another aspect, the present invention provides a dental surgery guide system for use with a surgical handpiece for a surgical intervention, notably for forming a bore in a patient's jaw bone to receive a dental implant, the dental surgery guide system comprising a surgical template adapted to be secured within the patient's mouth, the surgical template comprising an opening coinciding with a surgical axis, notably an implant axis for the dental implant, to allow passage of a surgical instrument along the surgical axis, notably to create the bore in the patient's jaw bone along the implant axis; one or more template guide rails, each template guide rail having its longitudinal axis aligned parallel to and offset from the surgical axis; and a template stop; and wherein the template stop and the handpiece stop are adapted to cooperate to limit the position to which the surgical instrument can advance during the surgical intervention, notably during creation of the bore in the patient's jaw bone; and wherein the bottom of the template guide rail(s) is positioned at a level below the upper position of the gingiva and/or corresponding jaw bone, notably where the bore is to be formed. An associated aspect relates to a handpiece jig adapted to be secured to the surgical handpiece, said handpiece jig comprising one or more handpiece guides, each handpiece guide being engageable with a respective template guide rail of the template guide, and a handpiece stop, wherein cooperation between the handpiece guide(s) and the template guide rail(s) restrains the lateral position and the axial orientation of the surgical instrument relative to the surgical template during the surgical intervention, notably during creation of the bore in the patient's jaw bone.

The surgical template may be adapted for a surgical intervention at a single surgical site, for example for inserting a single dental implant in a patient's jaw. Alternatively, the surgical template may be adapted for a plurality of surgical interventions, each at a different surgical site, for example the insertion of two, three, four, five, or more dental implants in to a patient's jaw. Preferably, each surgical site is associated with a corresponding template guide rail or pair or template guide rails which form part of the surgical template. A single handpiece guide may be used for a plurality of surgical interventions using a single surgical template; in this case, the template stop(s) for each surgical site are positioned and configured with a view to the intended surgical intervention.

Different aspects of the invention may be combined in a single embodiment.

Embodiments of the invention will now be described, by way of example only, with reference to the accompanying drawings of which:

FIG. 1 is a schematic representative of a surgical template;

FIG. 2*a* and FIG. 2*b* are schematic representatives of handpiece jigs;

Figure 1:
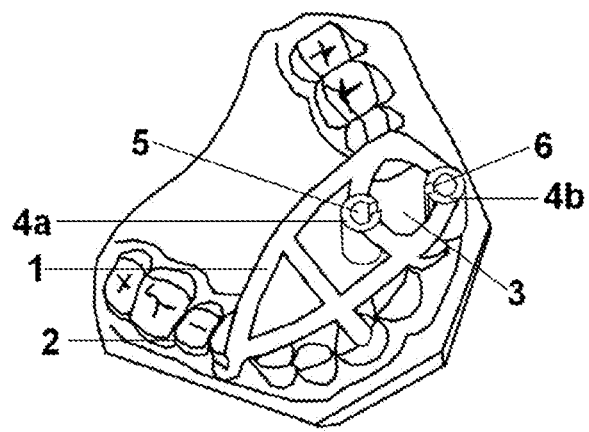

FIG. 1 shows a custom surgical template 1 secured on a patient's dentition 2. The surgical template comprises: an opening 3 that coincide with a surgical axis, in this case a drilling and implant axis 13 (see FIG. 2); two template guide rails 4a, 4b; and two template stops (not visible). Each template guide rail 4a, 4b comprises a substantially cylindrical hollow passage 5 and a lateral opening 6 along its length which opens into the hollow passage and into the template opening 3. The template guide rails 4a, 4b are retained by part of a template frame, notably comprising a series of template struts. The open form of the template frame facilitates accessibility and visibility for the surgical site which in this example is a site at the jaw bone located between the template guide rails 4a, 4b.

For simplicity, the illustrated surgical template is shown for drilling a single bore. Generally, the surgical template is configured for providing two or more spaced bores, the position of each desired bore being provided by respective template guide rails.

Figure 2A:
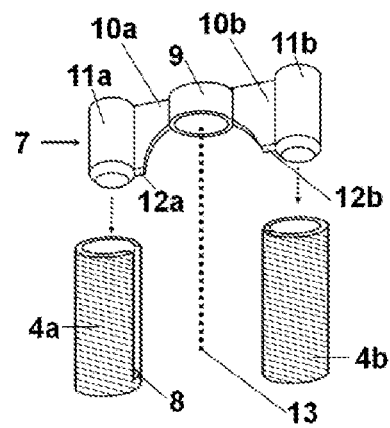

FIG. 2a shows an enlarged view of a first embodiment of template guide rails 4a, 4b and a handpiece jig 7 adapted to cooperate with the template guide rails. Template stops 8 are located towards the bottom of the template guide rails. The handpiece jig comprises: an attachment ring 9 adapted to be secured to a surgical handpiece, in this case a dental drilling handpiece; two supporting flanges 10a, 10b projecting from the attachment ring; and two male type handpiece guides 11a, 11b each of which is adapted to be slidably received in a respective one of the female type template guides 4a, 4b during the surgical intervention. Each of the two handpiece guides 11a, 11b is attached to a respective supporting flange 10a, 10b of the handpiece jig; a portion of each supporting flange 10a, 10b is adapted to be slidably received in the lateral opening 8 of its respective template guide rails 4a, 4b during the surgical intervention. A handpiece stop 12a, 12b is provided at each supporting flange. As illustrated in FIG. 2a, the handpiece stops 12a, 12b may be provided at or towards a lower portion of the supporting flange(s), notably by a lower surface of the supporting flange(s). The supporting flanges (and respective handpiece guides) are situated on either side of the attachment ring with the drilling axis 13 and the principal axis of each handpiece guide being coplanar. As illustrated, each supporting flange 10a, 10b may be attached to its respective handpiece guide 11a, 11b along substantially the entire length of its handpiece guide 11a, 11b; this assists in providing mechanical stability. Each supporting flange may rise, notably in an arc, from a lower portion to an upper portion at which it is attached to the attachment ring 9 so as to provide a greater separation between the two flanges at their lower portions compared with the opening at their upper portions; this again contributes to accessibility and visibility for the surgical site, particularly for a surgical intervention in a patient's jaw bone.

Figure 2B:
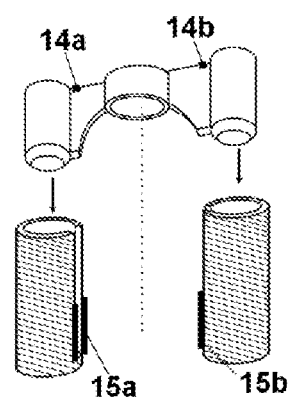

FIG. 2b illustrates an alternative embodiment in which the handpiece jig 7 comprises handpiece stops 14a, 14b, at or towards the top of each supporting flange and the template guide rails 4a, 4b comprise template stops 15a, 15b which are located at the exterior of the template guide rails 4a, 4b. Notably in this type of configuration, each handpiece guide is preferably associated with a pair of handpiece stops, for example a first handpiece stop 14a positioned at a front face of the flange 10a and a second handpiece stop (not shown) positioned at a corresponding position at a rear face of the flange 10a. Each such handpiece stop cooperates with an associated template stop, for example, a pair of template stops 15a located either side of a lateral opening 8 or slot of the template guide 4a.

Figure 3:
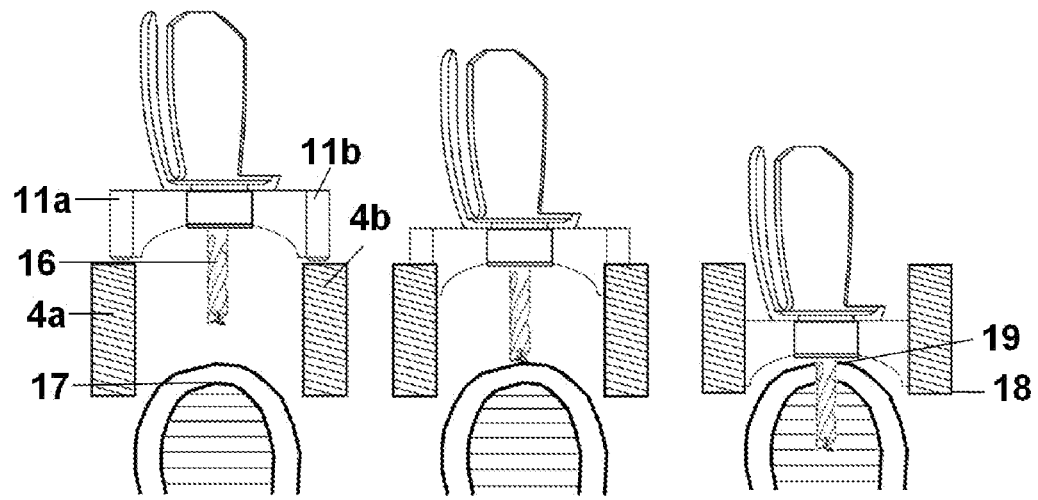
FIG. 3 and FIG. 4 are sequential cross sections of a drilling operation.

In FIG. 3 sequential positions of the handpiece guide 11a, 11b of FIG. 2a are shown in use during a drilling procedure. For clarity other portions of the surgical template are not shown. Notably, this illustrates engagement and sliding progression of the handpiece guides 11a, 11b of the handpiece jig 7 within the template guide rails 4a, 4b and penetration of a drill bit 16 into the jaw bone 17 to create a desired bore. The two template guide rails are located on either side of the gingiva and jaw bone and the bottom of the template guide rails 18 are positioned at a level below the upper position of the gingiva 19 and corresponding jaw bone 17. When the template guide rails are engaged within the handpiece guides, the surgeon has only a single degree of free movement i.e. a sliding movement of the drill bit towards or away from the jaw bone at a predefined lateral position and along a predefined axis. The drill can be slid towards the surgical site guided by the surgical template and the handpiece jig. The maximum depth of the handpiece jig relative to the surgical template, and thus the maximum depth bore drilled, is fixed by contact between the template stops 8a, 8b and the handpiece stop 12a, 12b.

Figure 4:
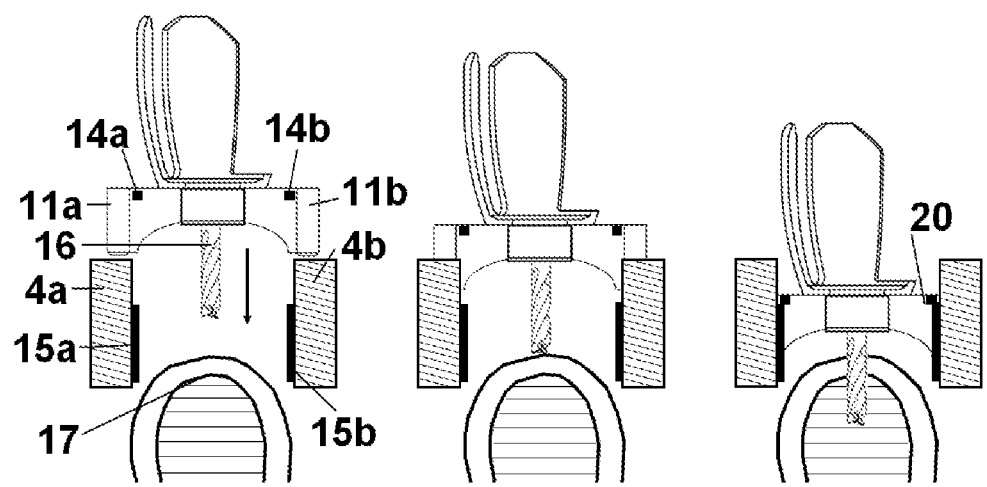

FIG. 4 shows corresponding positions of a handpiece guides 11a, 11b during a drilling procedure using the system of FIG. 2b; the maximum depth of the handpiece jig relative to the surgical template, and thus the maximum depth bore drilled, is fixed by contact 20 between the template stops 15a, 15b and the handpiece stop 14a, 14b.

Figure 5:
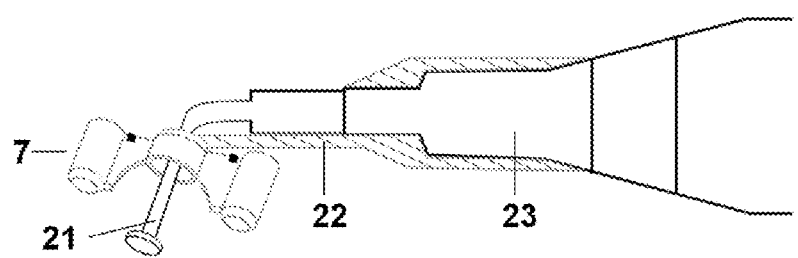
FIG. 5 is a schematic representation of a piezotome tip and a handpiece jig secured to a dental handpiece.

FIG. 5 shows a piezotome tip 21 and a handpiece jig 7 secured to a surgical handpiece 23, in this embodiment through a suitable connecting piece 22. As illustrated, it is preferable, to allow free vibration of the piezotome tip 21, for example by securing the handpiece jig to, for example, the surgical handpiece 23 rather than to the piezotome tip 21 or any vibrating part of the piezotome system but in a way that the position of the handpiece jig with respect to the piezotome tip 21 is fixed

The invention claimed is:

1. A dental surgery guide system for use with a surgical handpiece for a surgical intervention, the dental surgery guide system comprising:
   a surgical template adapted to be secured within the patient's mouth, the surgical template comprising:
   an opening that coincides with a surgical axis, to allow passage of a surgical instrument for access to a surgical site;
   one or more template guide rails, each template guide rail having its longitudinal axis aligned parallel to and offset from the surgical axis; and
   a template stop, the template stop being fixed relative to the template;
   a handpiece jig adapted to be secured to the surgical handpiece, said handpiece jig comprising:
   one or more handpiece guides, each handpiece guide being engageable with a respective template guide rail, and
   a handpiece stop, the handpiece stop being fixed relative to the handpiece guide(s);
   the handpiece guide(s) and the template guide rail(s) cooperating to restrain the lateral position and the axial orientation of the surgical instrument relative to the surgical template during the surgical intervention and permitting relative sliding movement therebetween along the surgical axis towards the surgical site during the surgical intervention; and wherein the template stop and the handpiece stop are adapted to cooperate to limit the depth to which the surgical instrument can advance along the surgical axis during the surgical intervention, the handpiece stop moving with the handpiece guide(s) towards the surgical site along an axis parallel to the surgical axis during said relative sliding movement to advance the surgical handpiece along the surgical axis towards the surgical site during the surgical intervention, and the handpiece stop engaging with the template stop at a predetermined position during said relative movement during the surgical intervention to prevent further advancement of the surgical instrument towards the surgical site, and wherein each handpiece guide has a proximal end and a distal end whereby, during the surgical intervention, the proximal end of the handpiece guide is in closer proximity to the handpiece along the surgical axis than the distal end of the handpiece guide;

wherein each template guide rail has a proximal end and a distal end whereby, during the surgical intervention, the proximal end of the template guide is in closer proximity to the handpiece along the surgical axis than the distal end of the guide rail; and wherein, during the surgical intervention, the entire proximal end of the handpiece guide can slide below the proximal end of the template guide rail.

2. The dental surgery guide system of claim 1 wherein the template stop is positioned towards the distal end of the one or more template guide rails.

3. The dental surgery guide system of claim 1 wherein the one or more template guide rails comprise the template stop.

4. The dental surgery guide system of claim 1 wherein the one or more template guide rails comprises a hollow passage in which its associated handpiece guide is slidably moveable during the surgical intervention.

5. The dental surgery guide system of claim 4, wherein the hollow passage of the one or more template guide rails is substantially cylindrical and the one or more template guide rails comprise a lateral opening along its length which opens into the hollow passage.

6. The dental surgery guide system of claim 5, wherein the one or more handpiece guides comprises a substantially cylindrical pin.

7. The dental surgery guide system of claim 5, wherein the handpiece jig comprises an attachment ring adapted to be secured to the surgical handpiece and one or more supporting flange(s) projecting from the attachment ring wherein the one or more handpiece guide(s) are attached to respective supporting flange(s), wherein the supporting flange(s) are adapted to be slidably received in the lateral opening of the respective template guide rails and wherein the handpiece stop is provided by a portion of the one or more supporting flange(s).

8. The dental surgery guide system of claim 1 wherein the one or more handpiece guides comprises two handpiece guides.

9. The dental surgery guide system of claim 8, wherein the two handpiece guides are positioned in the same plane that contains the surgical axis.

10. The dental surgery guide system of claim 1 wherein the surgical instrument is a piezotome tip.

11. The dental surgery guide system of claim 1 wherein the surgical instrument is a drill.

12. The dental surgery guide system of claim 1 wherein the distal end of the template guide rail(s) is configured to be positioned at a level below the upper position of the gingiva and/or jaw bone.

13. The dental surgery guide system of claim 1,
wherein the one or more template guide rails consist of two template guide rails, one of the template guide rails being configured to be located on one side of the jaw-bone or gingiva of the patient and the other of the template guide rails being located on the other side of the jaw-bone or gingiva of the patient.

14. The dental surgery guide system of claim 1,
wherein the one or more template guide rails comprise a hollow passage in which its associated handpiece guide is slidably moveable during the surgical intervention and a lateral opening along its length which opens into the hollow passage;
wherein the handpiece jig comprises a flange which is slidably moveable during the surgical intervention in the lateral opening along the length of the template guide rail;
and wherein the handpiece stop is provided on the flange of the handpiece jig.

15. The dental surgery guide system of claim 14, wherein the template stop is provided by a closed off portion of the lateral opening and the handpiece stop is provided by a lower surface of the flange.

16. The dental surgery guide system of claim 15, wherein the template stop is provided by the closed off portion of the lateral opening is at the distal end of the one or more template guide rail(s).

17. The dental surgery guide system of claim 14, wherein the handpiece stop is positioned at a front face of the flange and the template stop is provided at a side of the lateral opening.

18. The dental surgery guide system of claim 1, wherein the handpiece jig is configured to be connected onto a head of the surgical handpiece.

19. The dental surgery guide system of claim 1, wherein the handpiece jig is configured to be clipped onto a head of the surgical handpiece.

* * * * *